Nov. 22, 1966  R. L. ALLEY  3,286,732
FLOW CONTROL DAMPER
Filed Feb. 4, 1963  2 Sheets-Sheet 2
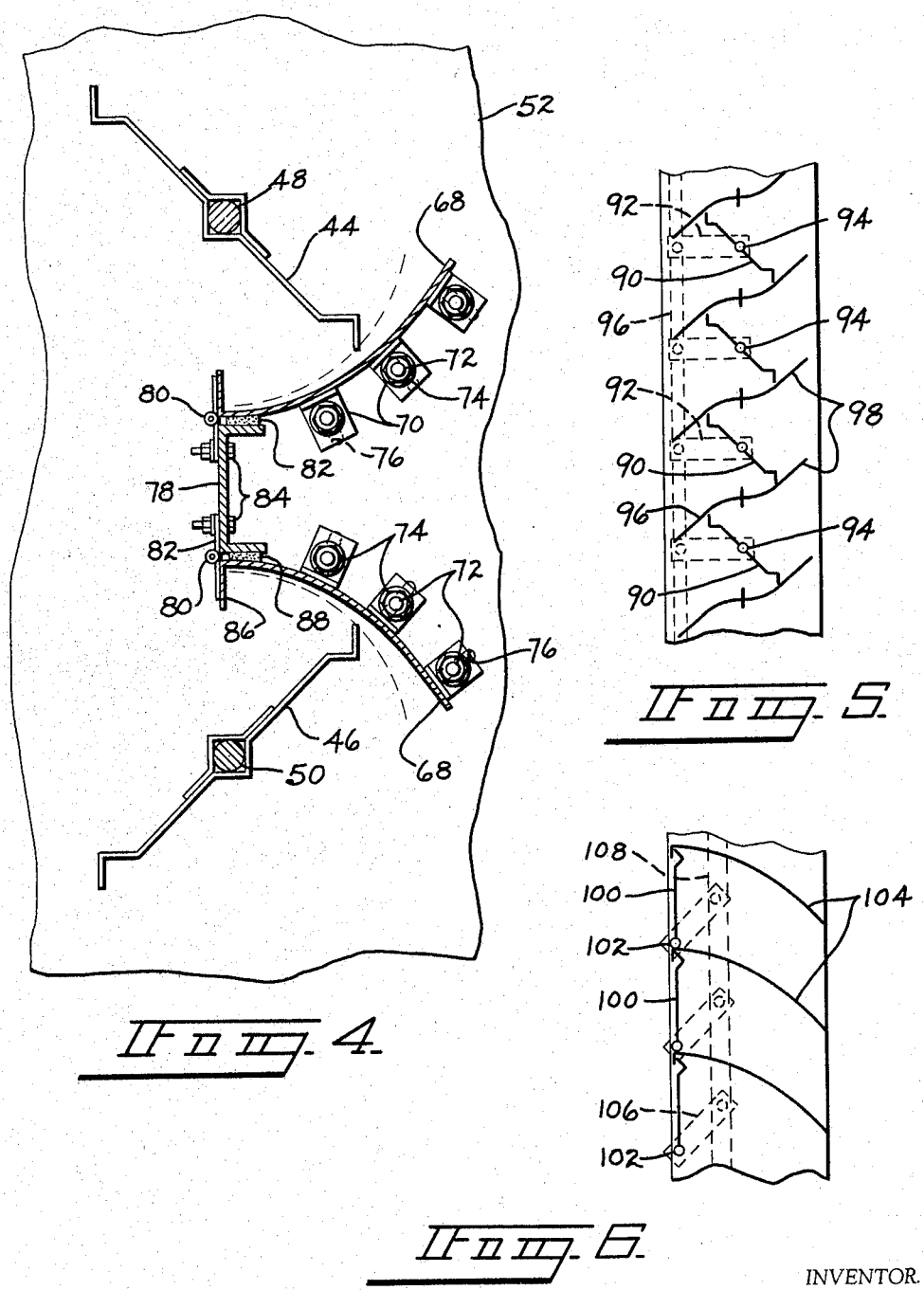
INVENTOR.
RAYMOND L. ALLEY
BY
*Owen & Owen*
ATTORNEYS

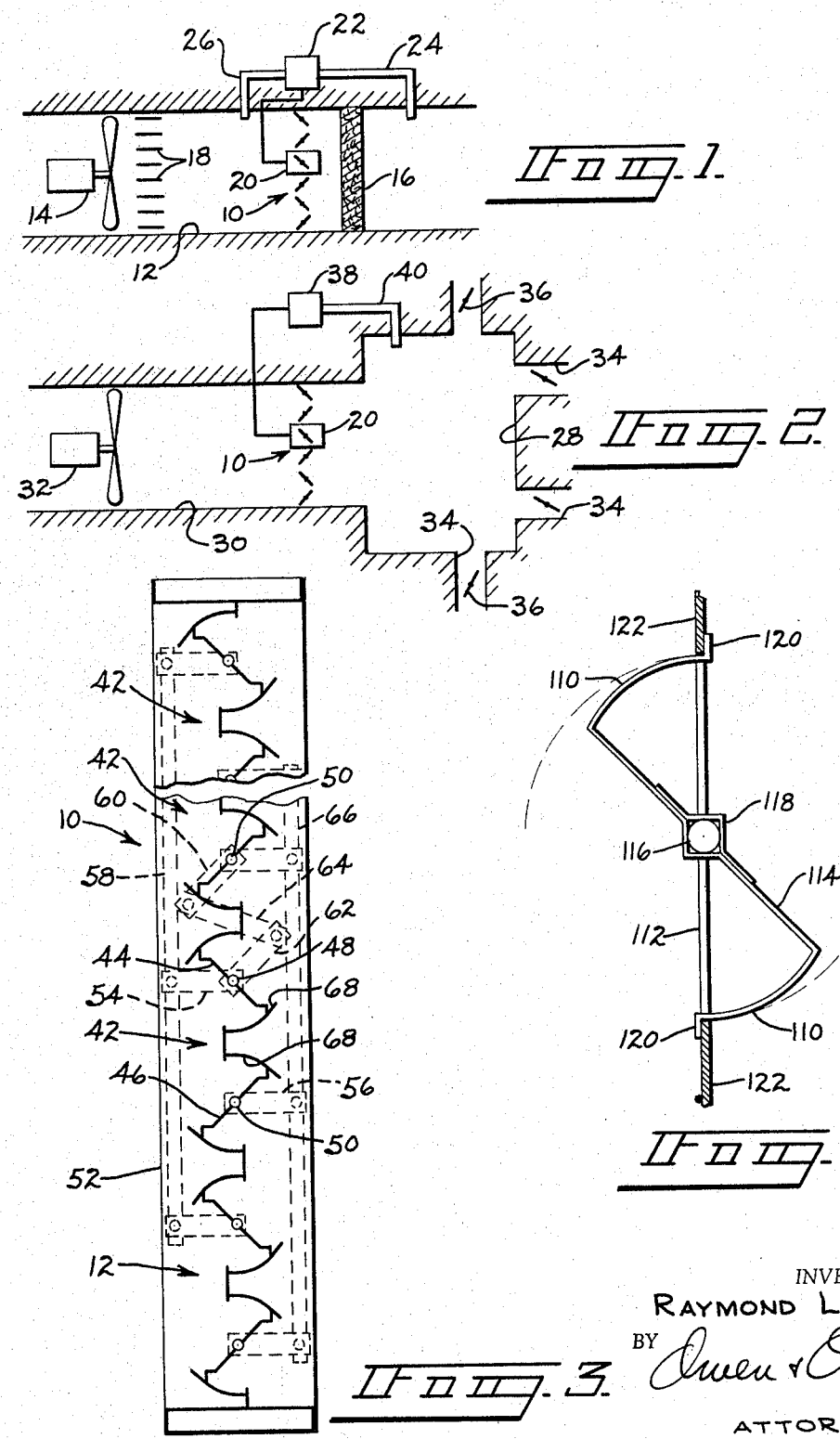

United States Patent Office 3,286,732
Patented Nov. 22, 1966

3,286,732
FLOW CONTROL DAMPER
Raymond L. Alley, Toledo, Ohio, assignor to The American Warming & Ventilating, Inc., Toledo, Ohio, a corporation of Ohio
Filed Feb. 4, 1963, Ser. No. 255,794
3 Claims. (Cl. 137—601)

This invention relates to a flow control damper capable of controlling fluid flow more closely than heretofore possible.

Many dampers are known in the art for regulating flow of fluid in a passage. These dampers, however, have been incapable of controlling flow closely, particularly because an excessively large flow is established when the dampers are first cracked open. The present invention relates to a flow control damper employing curved baffles adjacent the damper blades, which baffles enable the effective open area of the damper for the passage of fluid to be more closely controlled than heretofore possible, in order to obtain close control over fluid flow. The damper components can also be reversed so that a curved blade is employed rather than a curved baffle, as will be discussed more fully subsequently.

It is, therefore, a principal object of the invention to provide an improved damper capable of more closely controlling the flow of fluid therethrough.

A number of other objects and advantages of the invention will be apparent from the following detailed description of preferred embodiments thereof, reference being made to the accompanying drawing, in which:

FIG. 1 is a schematic view of an application of the flow control damper in accordance with the invention, where a constant flow or volume is desired;

FIG. 2 is a schematic view of another application of the flow control damper, where constant pressure is desired;

FIG. 3 is a fragmentary schematic view in vertical cross section of the flow control damper;

FIG. 4 is an enlarged, detailed view in cross section of a portion of the damper shown in FIG. 3;

FIG. 5 is a schematic view in vertical cross section of a slightly modified damper embodying the invention;

FIG. 6 is a schematic view in vertical cross section of another modified damper embodying the invention; and FIG. 7 is a somewhat schematic view in vertical cross section of still another modified damper embodying the invention.

Referring to the drawing, and more particularly to FIG. 1, an installation requiring constant volume is shown, with a flow control damper 10 embodying the invention located laterally of a duct or passage 12 through which air or other fluid is passed by means of a fan 14. A filter 16 is located downstream of both the fan 14 and the damper 10, in this instance, to remove contaminants from the air. The filter 16 provides greater resistance to the flow of air therethrough as contaminants are collected therein and the filter becomes dirty or plugged. This is particularly true for finer filters such as an absolute 5 mesh filter, the pressure drop across which, when the filter is dirty, might be twenty times the amount when the filter is clean. In such an instance, the flow of air will also vary considerably through the passage 12, which is usually undesirable. The damper 10 in the duct 12, however, can be regulated so that a constant resistance or pressure drop is established from one end of the duct to the other. This is accomplished by maintaining the damper 10 substantially closed when the filter 16 is clean and by opening the damper as the filter becomes dirty or plugged. In this manner, a constant pressure drop or resistance can be attained with the flow of air thus remaining constant under all conditions. Straightening vanes 18 can be located between the fan 14 and the damper 10, if desired, to provide a more uniform flow of air through the duct 12. The position of the damper 10 is controlled by a motor 20, the operation of which is controlled by a pressure instrument 22 which measures the pressure drop across both the filter 16 and the damper 10 by means of lines 24 and 26.

In a specific example, for purposes of illustration, the duct 12 measured 72 inches by 62½ inches with air flow of 14,700 c.f.m. The filter in this instance had a resistance varying from ¼ inch w.c., when clean, to 5 inches w.c., when dirty. With a conventional opposed-blade damper used in place of the damper 10, flow control was not accurate enough, the change in the blade position varying only 10° between the maximum clean and dirty conditions of the filter. By employing a damper according to the invention, however, the blades could be rotated 70° between the extreme conditions, which enable accurate control to be relatively easily attained.

Referring more particularly to FIG. 2, an installation for the damper 10 is shown in which constant pressure is required in a plenum chamber 28. Air or other fluid is supplied to the plenum chamber 28 through a supply duct 30 by a fan 32. The air is then removed from the chamber 28 through a plurality of outlet ducts 34, the flow through which is controlled by valves 36. A constant pressure is desired in the chamber 28 so that the flow through the ducts 34 can be effectively controlled by the damper blades 36. Ordinarily, the pressure would drop as more air is removed through the ducts 34 and the pressure would increase when the flow through the ducts 34 is restricted. However, the damper 10 is controlled through a pressure-responsive instrument 38 which measures the pressure in the chamber 28 through a line 40 and then actuates the damper motor 20 to move the blades of the damper 10 accordingly. Hence, if the pressure in the chamber 28 should drop because of a larger flow of air therefrom, the damper 10 is opened to enable more air to flow into the chamber 28 from the fan 32. Similarly, if pressure in the chamber 28 rises because of a decrease in the flow of air therefrom, the damper 10 is moved toward a closed position to restrict the flow of air into the chamber 28.

The damper 10 is shown in detail in FIGS. 3 and 4, and includes a number of pairs 42 of opposed damper blades 44 and 46 which are affixed to axles 48 and 50, respectively. The axles 48 and 50 extend through side frame members 52 and are welded or otherwise affixed to arms 54 and 56. The arms 54 for the blades 44 are pivotally connected by a connecting link 58, with one of the arms 54 being rotated by its associated axle 48 which is connected to the motor 20. The axle 50 above the drive axle 48 is connected to that axle through parallel arms 60 and 62 and a connecting link 64, with the remaining arms 56 thereby driven through a connecting link 66. The connecting link 66 and the arms 56 move opposite to the connecting link 58 and the associated links 54 because of the arrangement of the links 60–64. The blades 44 and 46 of each of the pairs 42 thus rotate in opposite directions, but move simultaneously and equally toward closed or opened positions.

A curved baffle 68 is associated with each end of the blades 44 and 46 with all of the baffles 68 being similar in shape, although differently positioned. Each of the baffles 68 extends completely across the louver 10 between the side frame members 52 and is curved transversely so as to be in a predetermined position with respect to the end of the associated blade 44 or 46 and to the arcuate path defined by the end of the blade, as indicated by dotted lines in FIG. 4. The baffles 68 are affixed at their ends to the side frame member 52 by tabs 70 which are suitably affixed to the baffles 68 and are connected to the side frame member 52 by bolts 72 and nuts 74. The tabs 70 have slots or elongate openings 76 through which the bolts 72 extend so that the position of the curved baffle 68 can be adjusted, being moved either toward or away from the arcuate path of the associated blade. It may be noted that the entire baffle 68 need not be moved since portions thereof can be adjusted by changing only one of the three tabs 70. Of course, more or fewer tabs can be used depending on the size of the baffle 68.

While the baffle 68 will generally diverge from the arcuate path of the blade end, so as to provide a gradually increasing effective open area as the blades 44 and 46 are rotated, the baffles can be adjusted so that the effective open area is decreased as the blades are opened or the effective open area can increase and then decrease again or decrease and then increase again as the blades move toward the open position. Further, the baffles 68 at the upper and lower ends of the damper 10 can be adjusted differently so that different flow occurs at the upper and lower portions of the duct, if desired.

While the baffles 68 are adjustable, it will be readily understood that they can also be affixed to the frame members 52 in predetermined fixed positions. This is particularly done where a large number of the dampers 10 are to be used for a particular application and the blades are assembled in the proper curved positions when the dampers are manufactured so that no adjustment is then necessary, the proper positions first having been determined experimentally or mathematically, for example.

As shown in FIG. 4, the baffles 68 of each of the pairs 42 are connected to a central channel member 78 by means of piano hinges 80. This arrangement still enables each of the blades 68 to be adjusted even though the one edge is affixed to the channel members 78. Further, plates 82 of the hinges 80, which are connected to the channel member 78 by bolts 84, are slotted so that the baffles 68 can be moved slightly toward and away from the associated blade 44 or 46 when in its closed or vertical position to adjust the extent of initial effective open area, if any, of the damper 10. Of course, if the baffles 68 are not made adjustable, they can be welded directly to the channel member 78, for example, or the two baffles 68 with the channel member 78 therebetween can even be made of one piece of sheet metal. Each of the baffles 68 has a flange 86 cooperating with the end of the associated blade 44 or 46 to reduce leakage through the damper 10 and sealing strips 88 are located between the channel 78 and the baffles 68 for the same purpose.

For wide ducts such as the 72-inch wide duct previously mentioned, the blades 44 and 46 will be separated in the center of the duct by a supporting mullion with the blades on each side of the mullion being rotated by separate motors and linkages, with both motors preferably being opearted by the single control 22 or 38. If desired, the blades 46 can be operated by one motor and the blades 48 by a second motor so that only half of the blades open or close at any one time to provide additional control over fluid flow.

All of the damper blades can be rotated in one direction, as shown in FIG. 5 where damper blades 90 rotate in a common direction by means of arms 92 extending in the same direction from axles 94 and connected by a link 96. In this instance, curved baffles 98 are positioned in S-shaped patterns, rather than being opposed, as shown in FIGS. 3 and 4.

If desired, the blades can be pivoted from their ends rather than their central portions. Blades 100 of FIG. 6 are so pivoted by axles 102 at one longitudinal edge thereof with the axles 102 located adjacent curved baffles 104 for the next lower damper blades 100 therebelow. The baffles 104 are all generally parallel in this instance and the axles 102 are rotated in the same direction by suitable arms 106 and a link 108. Again, the curved baffles 104 are located in predetermined positions with respect to the arcuate paths of the ends of the blades 100.

The damper arrangement can be reversed so that the curved member now is the blade rather than the baffle and the member having the straight edge now is the baffle rather than the blade. Such an arrangement is shown in FIG. 7 in which curved blades 110 are connected by legs 112 and 114, of different lengths, to a hub 116 mounted on a shaft 118. The blades in this instance have lips 120 which provide a sealing relationship with baffles 122 when the blades are in a first or closed position. The blades 110 are rotated by the shaft 118 and move relative to the fixed baffles 122 so that the gap between the blades and baffles is of a predetermined magnitude when the blades are in other than the first position.

Various modifications of the above described embodiments of the invention will be apparent to those skilled in the art, and it is to be understood that such modifications can be made without departing from the scope of the invention, if they are within the tenor of the accompanying claims.

I claim:

1. A flow control damper including frame members, a plurality of damper blades rotatably supported by two opposed frame members, means for rotating said blades between open and closed positions with both edges of each of said blades defining arcuate paths, said blades being pivoted about axes intermediate the longitudinal edges of the blades, a plurality of curved baffles extending between the opposed frame members, said baffles being located adjacent the arcuate paths of said blades with at least portions of the baffles being laterally spaced from portions of said paths, and means for controlling the blade rotating means in response to a characteristic of fluid flowing through said damper to maintain said characteristic constant.

2. A flow control damper including frame members, a pair of damper blades centrally rotatably supported by two opposed frame members, means for rotating said blades between open and closed positions with edges of said blades defining arcuate paths, said blades being curved and diverging from the arcuate paths, a plurality of baffles extending between said opposed frame members, said baffles being located adjacent the arcuate paths of said blades with at least portions of the baffles being laterally spaced from portions of said paths, and means for controlling the blade rotating means in response to a characteristic of fluid flowing through said damper to maintain said characteristic constant.

3. A damper according to claim 1 wherein adjacent blades are rotated in opposite directions.

References Cited by the Examiner

UNITED STATES PATENTS

| | | | |
|---|---|---|---|
| 1,367,146 | 2/1921 | Junkers | 137—520 X |
| 2,145,086 | 1/1939 | Hoof | 138—46 X |
| 2,262,252 | 11/1941 | Roland | 137—506 X |
| 2,906,287 | 9/1959 | Kreuttner | 137—489 |

WILLIAM F. O'DEA, *Primary Examiner.*

D. LAMBERT, *Assistant Examiner.*